May 14, 1968  L. P. KUMPF  3,382,844
WORK TREATING APPARATUS
Filed July 1, 1964  9 Sheets-Sheet 1

FIG. 1.

Leonard P. Kumpf,
Inventor.
Koenig, Senniger,
Powers and Leavitt,
Attorneys.

May 14, 1968     L. P. KUMPF     3,382,844

WORK TREATING APPARATUS

Filed July 1, 1964     9 Sheets-Sheet 4

United States Patent Office 3,382,844
Patented May 14, 1968

1

3,382,844
WORK TREATING APPARATUS
Leonard P. Kumpf, Affton, Mo., assignor to Lasalco Incorporated, St. Louis, Mo., a corporation of Missouri
Filed July 1, 1964, Ser. No. 379,590
35 Claims. (Cl. 118—58)

This invention relates to apparatus for treating work. and more particularly to apparatus for processing metal parts or the like.

Among the various objects of this invention may be noted the provision of apparatus for treating work at a series of stations spaced at intervals along an endless path, the work being vertically lowered and raised at each station and advanced from one station to the next station while elevated; the provision of work treating apparatus of the type described wherein the work is loaded at a loading station into open-top carriers through the open top thereof while they are in a vertical position; the provision of improved work treating apparatus wherein the work may be tumbled in its carrier at certain work stations; the provision of improved work treating apparatus by means of which work may be dried at a drying station, and spun while it is being dried; the provision of improved work treating apparatus by means of which the work is automatically unloaded after the work has been treated; and the provision of improved work treating apparatus in which the time the work is subject to treatment at one station may be varied without effecting the time the work is treated at other stations. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention are illustrated.

2

Corresponding reference characters indicate corresponding parts throughout the several views of the drawings.

Referring to the drawings, an apparatus constructed in accordance with this invention is shown to comprise a turret designated in its entirety by the reference numeral 3, mounted for indexing rotation about the central vertical axis of a vertical frame 5. It carries a plurality of work carriers, each constituted by a perforated barrel, and each of which is designated 7. These barrels are carried by the turret for up and down movement relative thereto, and also for tilting movement relative thereto. As shown, six such barrels are provided on the turret, spaced at equal (60°) intervals around the turret. The turret constitutes a conveyor for the barrels, indexing them in steps (60° steps) around an endless path, i.e., a circular horizontal path having as its center the vertical axis of rotation of the turret, through six work stations S1–S6 spaced at equal (60°) intervals around said path. The barrels 7, when raised, hang down vertically (see the two barrels shown in FIG. 2). Considering the barrels in their hanging-down vertical position, they are closed at the bottom and open at the top.

Figure 10:
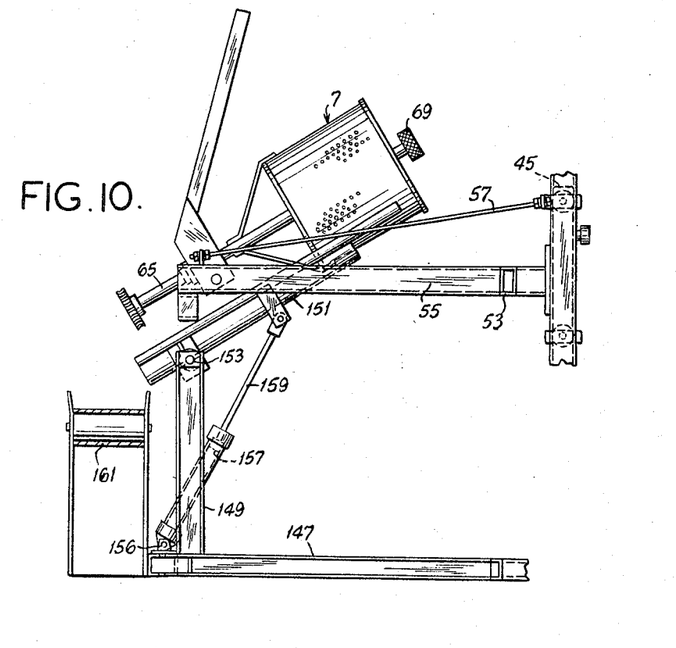
FIG. 10 is a view similar to FIG. 9 with the unloader elevated for removal of work from the carrier.

Station S1 constitutes a loading station. As each barrel is indexed to this station, it dwells there for an interval in vertical lowered work-receiving position (see FIG. 3) and work to be treated is loaded therein. It is then raised and indexed to station S2 where it is lowered into a processing solution in a tank T1. Then, it is raised and indexed to station S3 where it is lowered into a cold water rinse in a tank T2. Then, it is raised and indexed to station S4 where it is lowered into a hot water rinse in a tank T3. Then, it is raised and indexed to station S5 where it is lowered into a drying tank TD. Finally, it is raised out of tank TD and indexed to station S6 where it is tilted up for unloading the treated work by gravity discharge out of the open end of the barrel (see FIG. 10). The barrels 7 are tilted as they are vertically lowered into tanks T1, T2 and T3 by rocker arms 9 to engage a drive 11 for rotating the barrels, thereby tumbling the work in the barrels during plating and rinsing. The barrel in drying tank TD is rotated by a drive 13 to facilitate drying of the work.

Figure 12:
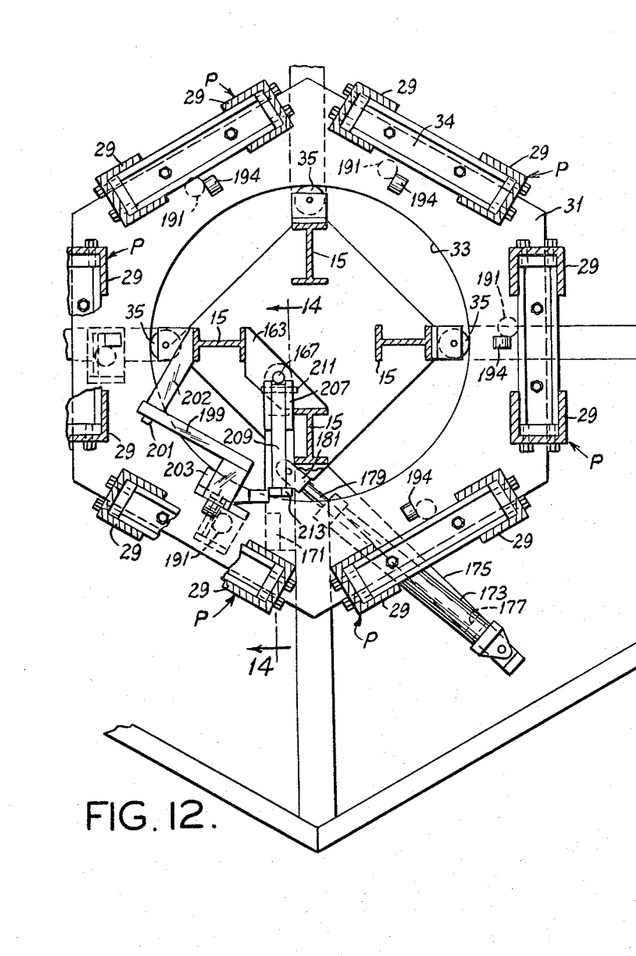
FIG. 12 is a horizontal section taken on line 12—12 of FIG. 11, certain lift mechanism being omitted for clarity.
Figure 13:
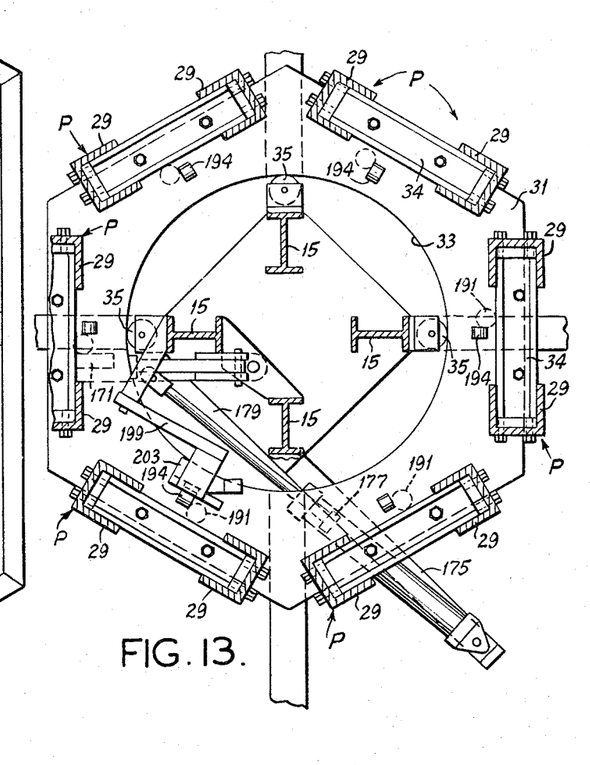
FIG. 13 is a section similar to FIG. 12 showing the conveyor advanced.

More particularly, frame 5 comprises four posts each designated 15 extending vertically upward from a base 17. Portions of the base designated 17a project outwardly from the posts at the work station S2 to S6 and support apparatus at these stations. Mounted on the upper ends of these posts is a cap plate 19. A stud 21 extends upward from the center of plate 19. The turret includes a hexagonal top plate 23 having a central hub 25 receiving the stud, this plate being rotatable about the hub. A thrust bearing 27 is provided between plates 23 and 19. The turret further includes six pairs of vertical guides, spaced at 60° intervals around the turret, each pair of guides being designated P, and the two guides of each pair each being designated 29. These guides are of channel-section, the open sides of the two channel-section guides of each pair being opposed to one another. These guides are secured at their upper ends to the turret top plate 23 and at their lower ends to a hexagonal bottom plate 31 having a circular opening 33 accommodating the posts 15. As shown in FIGS. 12 and 13, brackets 34 are bolted to plate 31 and the guides 29 for mounting the guides on the plate. Rollers 35 mounted on posts 15 engage the edge of plate 31 bounding the opening to steady the turret.

Lifting and lowering of barrels 7 is accomplished by a cylinder 37 centrally mounted on base 17 within the posts 15. Cylinder 37 has a piston 39 connected to a piston rod 41. Cylinder 37 moves piston 39 and piston rod 41 in a conventional manner. A circular lift plate 43 is mounted on the piston rod 41.

Positioned between the pairs of guides 29 are lift carriages or elevators 45 which have guide rollers 47 on both sides at the top and bottom riding in the guides. Each lift carriage has a follower roller 49 which projects inwardly between the guides 29 and which is adapted to bear on the lift plate 43 for raising and lowering the lift carriages by operation of cylinder 37. When turret 3 is rotated, the rollers 49 roll around the lift plate 43. Since there is only a sliding connection between the carriages and plate 43, the carriages may be independently raised or lowered as explained later.

Each carriage has a bracket 51 on the outside carrying a crossbar 53. A pair of arms 55 extends out horizontally from each crossbar, the arms being braced by tie rods 57. A horizontal pivot pin 59 is journalled in the outer ends of each pair of arms 55. Brackets 61 on pin 59 support a sleeve bearing 63. The axis of the bearing is at right angles to and offset from the axis of pin 59. Journalled in bearing 63 is a shaft 65 and the perforated barrel 7 is connected to the shaft 65 by braces 67. A friction wheel 69 is connected to the bottom end of the shaft 65 which projects through the bottom of barrels 7. A worm 71 on the upper end of the shaft 65 is driven by the drive 11 as explained hereinafter to rotate the shaft and barrel. The rocker arm 9 is connected to one of the brackets 61 so that movement of the rocker arm will tilt the barrel 7 about the axis of pivot pin 59.

Figure 1:
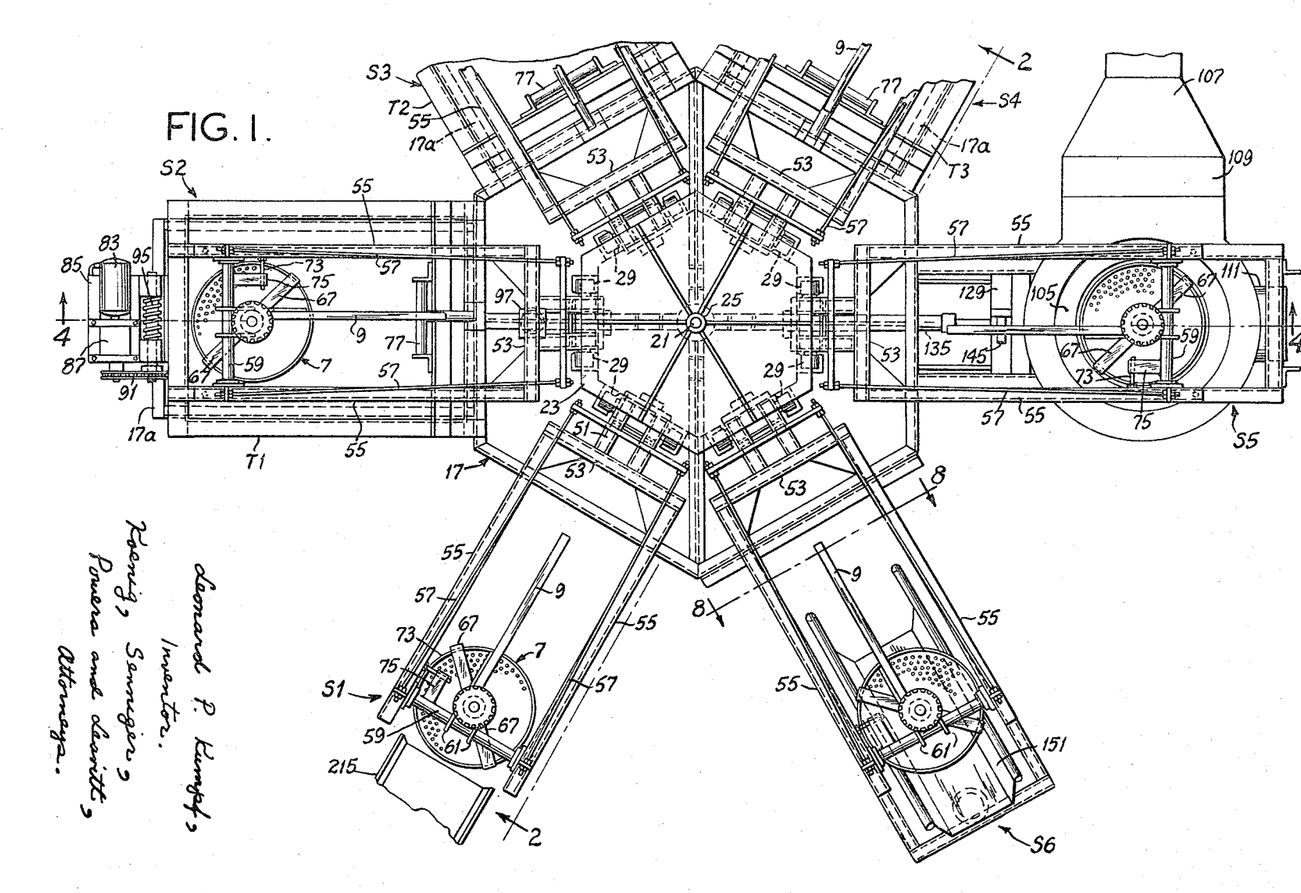
FIG. 1 is a plan of a work treating apparatus constructed in accordance with this invention, showing certain work carriers elevated, parts being broken away.
Figures 2, 8:
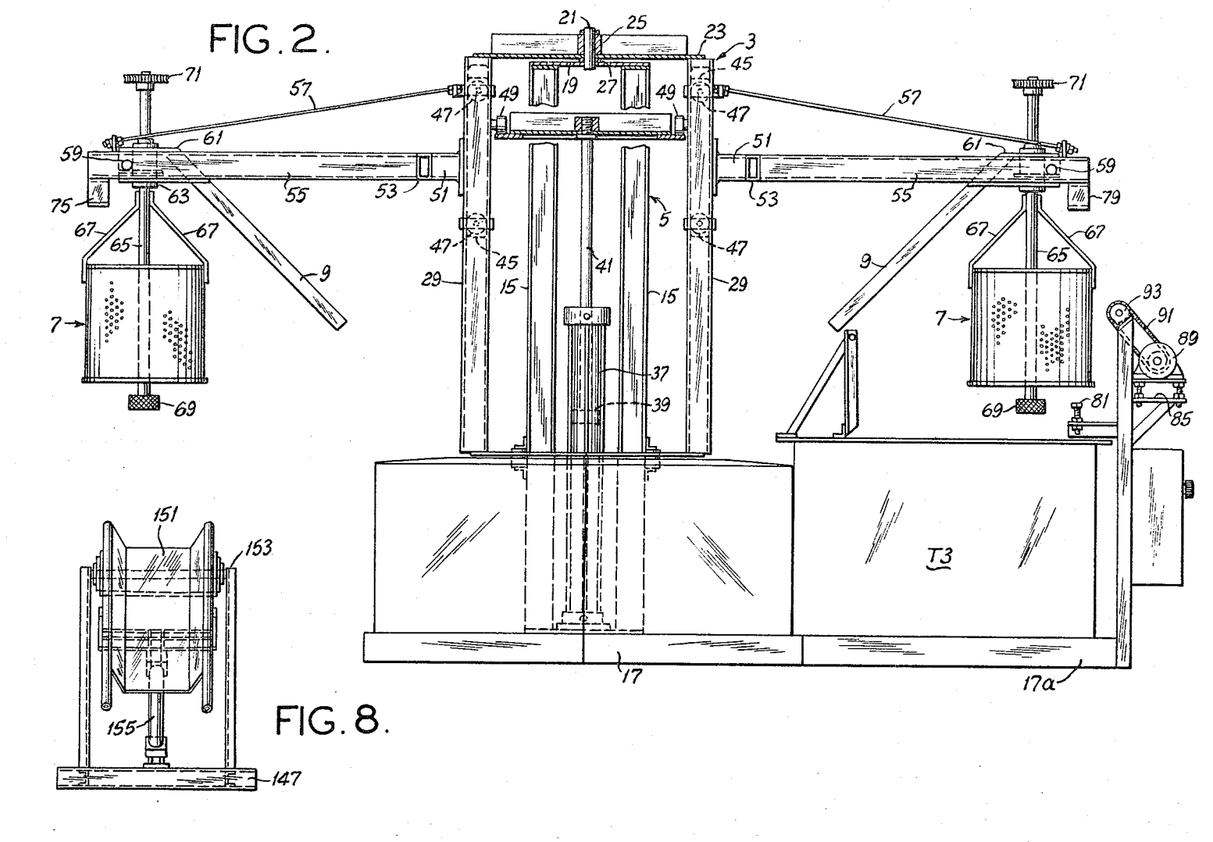
FIG. 2 is a vertical section taken on line 2—2 of FIG. 1.
FIG. 8 is a view taken on line 8—8 of FIG. 1 showing the unloading apparatus in lowered position.

A rod 73 (see FIG. 1) projects inwardly from one of the arms 55 and is engaged by a lug 75 connected to the pivot pin 59. The lug 75 and rod 73 cooperate to limit swinging movement of the barrel 7 about the axis of pivot pin 59, and are positioned so that the shaft 65 and the barrel are normally held in an upright vertical position as shown in FIG. 2.

Mounted on tanks T1, T2 and T3 are stops 77 which are engaged by rocker arms 9 as the barrels 7 are lowered into the respective tanks thereby to tilt the shaft 65 and barrel 7 about the axis of pivot pin 59. The inclination of the barrel and shaft is determined by the angle at which the rocker arm 9 is mounted and the location of the stop 77. Bottom members 79 at the outer ends of arms 55 engage stop screws 81 immediately above each of the tanks T1, T2 and T3 for limiting downward movement of the arms 55.

Each of the drives 11 comprises a motor 83 adjustable mounted on a support 85. A gear box 87 reduces the motor speed to the desired r.p.m. Sprocket 89 on gear box 87 drives a chain 91 to drive a sprocket 93, the latter driving a worm gear 95. When shaft 65 and barrel 7 are tilted, the worm 71 on the shaft 65 comes into engagement with the worm gear 95 for rotating the shaft 65 and the barrel 7, thereby tumbling parts or work in the barrel.

Figure 4:
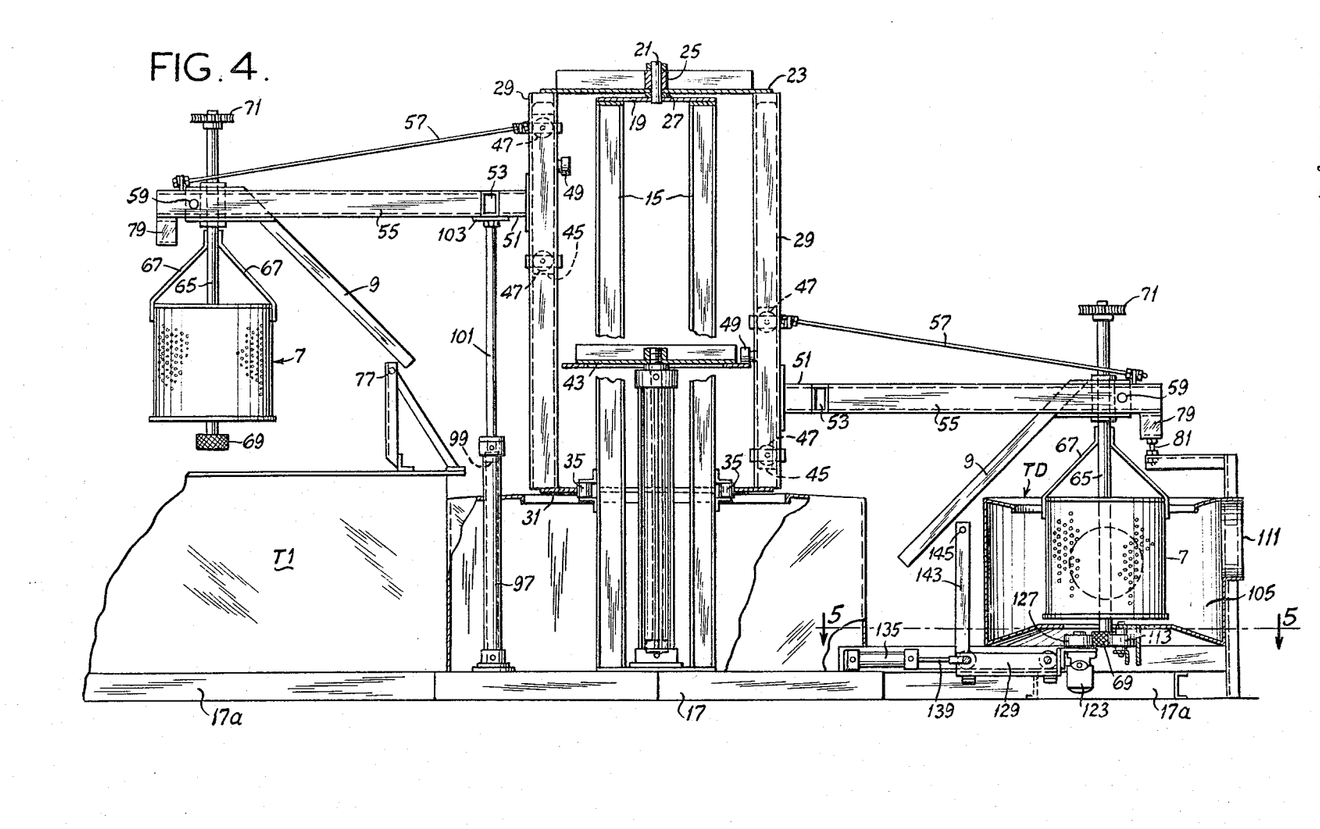
FIG. 4 is a vertical section taken on line 4—4 of FIG. 1, showing one work carrier elevated while the others are lowered.
Figures 5, 6:
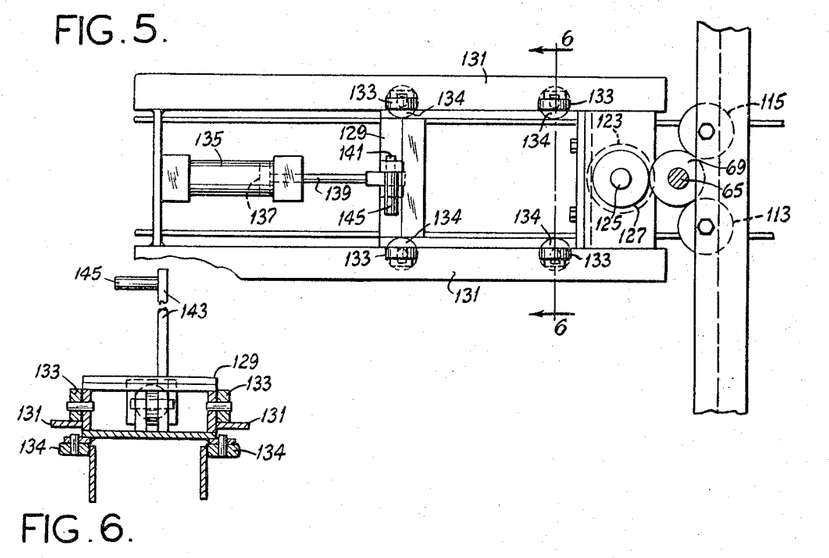
FIG. 5 is an enlarged horizontal section taken on line 5—5 of FIG. 4, showing certain apparatus for rotating the work carriers in a dryer.
FIG. 6 is a vertical section taken on line 6—6 of FIG. 5.

A cylinder 97 (see FIGS. 1 and 4) is mounted on the base 17 of the frame and piston 99 in the cylinder is connected to a piston rod 101. A lift plate 103 is connected to upper end of rod 101. Cylinder 97 is positioned so that on extension of rod 101, plate 103 will engage the crossbar 53 for arms 55 supporting the barrel 7 above the tank T1. By operation of cylinder 97, the barrel 7 at station S2 can be elevated prior to elevation of the other barrels or, as an alternative, can be set down subsequent to lowering of the other barrels. The sliding connection between rollers 49 and the lift plate 43 permits this independent movement of the barrels. Thus, the time a barrel 7 is in the tank T1 can be reduced relative to the time the other barrels are lowered at their respective work stations.

Tank TD has a drying chamber 105. Hot air is delivered to the drying chamber 105 from a blower or other source of air (not shown) which enters a conduit 107 and passes through a heating section 109 which may contain steam pipes, electric heating elements or other means for heating the air. The hot air leaves the chamber 105 either through its open top or through an outlet port 111 at the side.

The drive 13 for rotating the barrel 7 in drying chamber 105 is illustrated in FIGS. 4–7 and is shown to comprise two rollers 113 and 115 mounted for rotation on fixed vertical axes underneath the bottom of tank TD adjacent a central hole in the bottom of the tank. A motor 123 has a vertical shaft 125 which mounts a friction wheel 127. Motor 123 is carried by a slide 129 which moves longitudinally along spaced guides 131 toward and away from rollers 113, 115. Rollers 133 and 134 on the slide ride along the top and sides, respectively, of the guides. An air cylinder 135 is mounted toward one end of the guide. Piston 137 in cylinder 135 is connected to a piston rod 139 which in turn is connected to the slide 129 by a pin 141 which extends through the end of the rod and lugs 143 on the slide. One of the lugs 143 extends for some distance above the slide 129 and carries a pin 145 which is engaged by the rocker arm 9 to deflect barrel 7 slightly from its vertical position as the barrel is lowered into the drying chamber 105.

Figure 7:
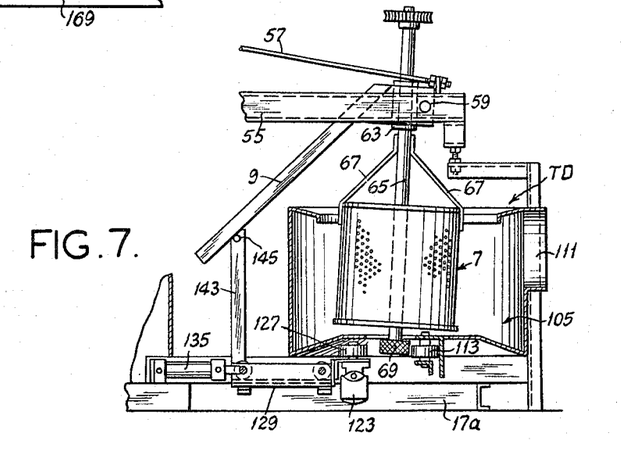
FIG. 7 is a vertical cross section of the drying station showing the apparatus for rotating the work carrier in disengaged position.

For lowering barrel 7 into the drying chamber 105, piston 137 in cylinder 135 is moved to the left as shown in the drawings to retract the piston rod 139 and move the slide 129 to its FIG. 7 position. As the barrel 7 is lowered to the FIG. 7 position, the rocker arm 9 engages the pin 145 to tilt the barrel 7 slightly which in turn moves the friction wheel 69 to the left to clear it away from the rollers 113 and 115. This movement of the wheel 69 to the left prevents lowering of the wheel onto the rollers 113 and 115 or their supports as the barrel is lowered. Wheel 69, when fully lowered, lies between rollers 113 and 115 and the wheel 127. Cylinder 135 then extends the rod 139 and moves the slide to its position of FIGS. 4 and 5. Rocker arm 9 is released by pin 145 and wheel 69 moves toward the right and into engagement with rollers 113 and 115. Shaft 65 and barrel 7 are then in their vertical (FIG. 4) position and wheel 69 is coplanar with wheel 123 and rollers 113, 115. As the slide 129 moves to the right, the wheel 127 engages the friction wheel 69. Motor 123 drives wheel 127 to rotate the friction wheel 69 and turn shaft 65 and barrel 7. At the end of the drying cycle the piston rod 139 is retracted and pin 145 engages arm 9 to move friction wheel 69 away from rollers 113, 115 and support 117 so that the barrel 7 can be elevated by the lifting mechanism previously described. After initial upward movement of the barrel 7, the pin 145 and arm 9 are disengaged and the barrel assumes its normal vertical position.

After the work has been dried in tank TD, it is indexed to the unloading station S6 and is unloaded by the mechanism U shown in FIGS. 1 and 8–10. The unloader mechanism U includes a base 147 and spaced posts 149 extending up from the base. Supported by posts 149 is a chute 151. One end of chute 151 pivots about pins 153 on posts 149.

An air cylinder 155 is pivoted at 156 on the base 147 and has a piston 157 which moves within the cylinder 155 to extend and retract a piston rod 159. The outer end of rod 159 is attached to an intermediate portion of the chute 151 so that extension and retraction of rod 159 swings the chute about pins 153.

Figure 9:
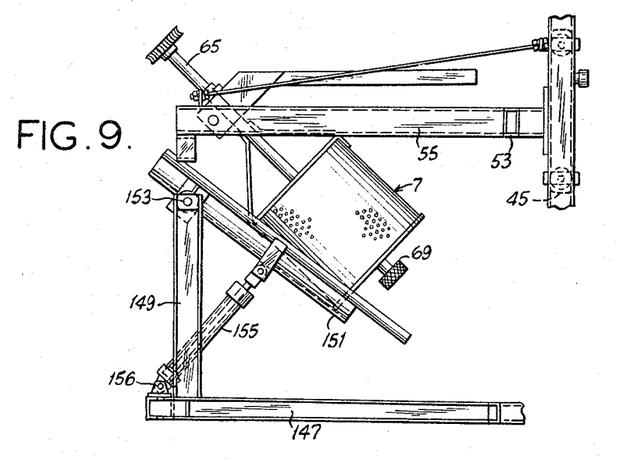
FIG. 9 is a side elevation of the unloading apparatus with the work carrier lowered.

As a barrel 7 is lowered at the unloading station S6, the bottom of the barrel engages the chute 151 (which is in its inclined position shown in FIGS. 8 and 9) and further lowering of the barrel causes it to rest on the chute in inclined position as shown in FIG. 9. Cylinder 155 is then operated to extend piston rod 159 and tilt the chute 151 to its oppositely inclined FIG. 10 position. This elevates the bottom of the barrel 7 above its open top so that the work is discharged from the inverted barrel into the chute 151, and slides down the chute to a conveyor mechanism 161 or to suitable containers. When the work has been unloaded, the piston rod 159 is retracted to lower the chute 151 to the FIG. 9 position and the barrel 7 can then be elevated and indexed to station S1, where it starts off on another cycle.

The conveyor mechanism 1 for indexing the barrels one station at a time is illustrated in FIGS. 11–16. Two spaced plates 163 and 165 are connected to adjacent ones of the posts 15 of frame 5 below turret plate 31. A pivot 167 extends between the plates and mounts a pusher arm 169. A pusher block 171 is connected to the upper surface of arm 169.

An air cylinder 173 is pivoted on a cylinder support 175 carried by the posts 15 of frame 5. A piston 177 in cylinder 173 moves a piston rod 179. A clevis 181 and pin 183 connect the piston rod 179 to the pusher arm 169 so that pusher block 171 is moved by operating cylinder 173.

A plurality of brackets 185 are spaced along the lower surface of the turret bottom plate 31. Brackets 185 carry pins 187 which mount hubs 189. Each of the hubs has a rod 191 projecting therefrom. Rearward pivotal movement of the rods 171 about pins 187 is limited by a stop 193 at the back of bracket 185. Extension of piston rod 179 moves the pusher arm 169 and block 171 clockwise about pin 167 until block 171 engages the rod 191 hanging downwardly from one of the brackets 185. The rod 191 is initially forced backwardly against the stop 193 (FIG. 16) and further movement of the arm 169 by piston rod 179 advances plate 31 on which bracket 185 is mounted. Plate 31 rotates 60° on a full stroke of piston rod 179 to advance the barrels one station.

Retraction of piston rod 179 moves the block 171 counterclockwise as viewed in FIGS. 12 and 13. Pusher block 171 will engage the back of the pin 191 supported by the next counterclockwise positioned bracket 185 and the rod 191 will then swing upwardly about the pivot 187 to the FIG. 16 dotted line position. This permits return of the block without moving plate 31. When the rod 179 is again advanced it engages the front of the rod 191 to force it against its stop for advancing the plate 31.

Figure 11:
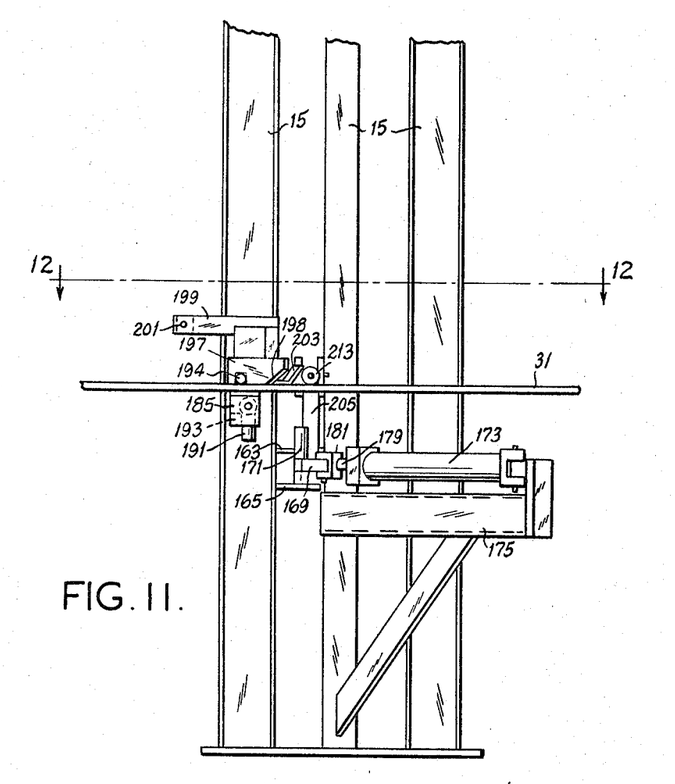
FIG. 11 is an enlarged fragmentary elevation showing the means for advancing the conveyor one work station.

A series of spaced stops 194 are secured to the upper surface of turret plate 31 above each of the brackets 185. Stops 194 are adapted to be received in a recess 195 in the lower edge surface of a plate 197 which constitutes a holder. Plate 197 is carried by an arm 199 pivoted at 201 on a support 202 on one of the posts 15. Elevation of arm 199 and plate 197 about pivot 201 releases the stop 194 and plate 31 for advancing plate 31. The leading edge of plate 197 is inclined as shown at 198 (FIG. 11). When the inclined surface 198 is engaged by an advancing stop 194, the plate 197 is elevated. When the plate 31 has been fully advanced, the stop 194 is received in recess 195 to hold the turret plate and the turret mechanism in position while the barrels 7 are lowered and elevated at the various work stations.

Figure 14:
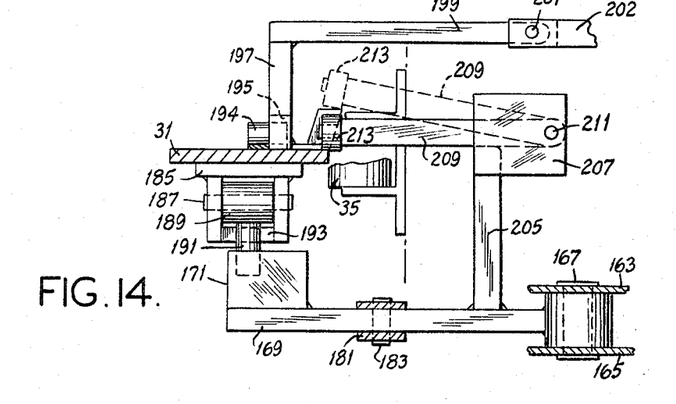
FIG. 14 is an enlarged vertical section taken along line 14—14 of FIG. 12.
Figure 15:
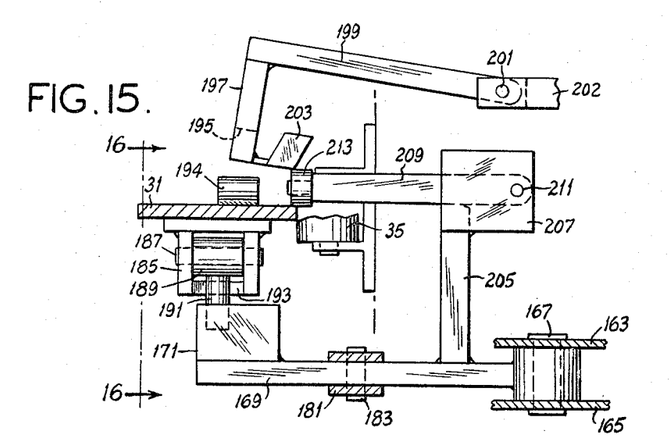
FIG. 15 is a view similar to FIG. 14 showing the conveyor partially advanced.
Figure 16:
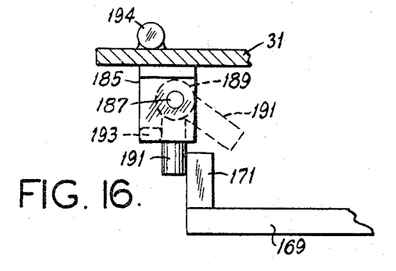
FIG. 16 is a detail view taken on line 16—16 of FIG. 15.

Connected to and extending radially inwardly from plate 197 is a lifter plate 203 for releasing holder plate 197 to permit movement of plate 31. Plate 203 has an edge turned upwardly from the turret plate 31 in a counterclockwise direction. In other words, the edge is inclined upwardly from left to right as viewed in FIGS. 12 and 13. Mounted on the pusher arm 169 between the pivot 167 and block 171 is a support 205 which carries two spaced mounting plates 207. A lift arm 209 is pivoted by pin 211 on the mounting plates 207. On the outer end of arm 209 is a roller 213. The roller 213 rolls on the upper surface of turret plate 31 and engages the lower surface of the turned-up edge of lift plate 203 as the arm 209 is moved clockwise from the FIG. 12 to the FIG. 13 position, thereby elevating the lift plate 203 and holder plate 197 to disengage the plate 197 and stop 194. Plate 197 is shown elevated in FIG. 15. When arm 209 is returned from the FIG. 13 to the FIG. 12 position, the roller 213 rolls across the upper surface of the plate 203. As shown in FIG. 14, arm 209 pivots about pin 211 as roller 213 rolls over the upturned edge of lift plate 203.

During operation of the apparatus for advancing the barrels 7 from one work station to the next work station, the cylinder 173 extends piston rod 179 which moves the pusher arm 169 and lift arm 209 in a clockwise direction from the FIG. 12 to the FIG. 13 position. During this movement the roller 213 engages lift plate 203 to elevate the plate or holder 197 and thus disengage stop 194 from the plate so that the turret plate 31 can be advanced. While the holder plate 197 is elevated, the pusher block 171 engages pin 191 to advance the plate 31 which, in turn, advances the turret 3 and the barrels 7. After roller 211 passes beneath the plate 203, the plate 197 is lowered by the weight of gravity and rests on the upper surface of plate 31 as it is advanced. When the next stop 194 on turret plate 31 moves toward plate 197, it engages the inclined leading edge 198 of plate 197 and elevates the plate so that the stop 194 can move along the lower surface of the plate into recess 195. As stop 194 enters recess 195 the plate 197 drops and holds the plate 31 stationary. When piston rod 179 is retracted, the parts are moved from the FIG. 13 to the FIG. 12 position and pusher block 171 will engage a rod 191 which will pivot about its pin 187 and move out of the way of the block 171. Roller 211 will ride over plate 203 as indicated in FIG. 14.

Figure 3:
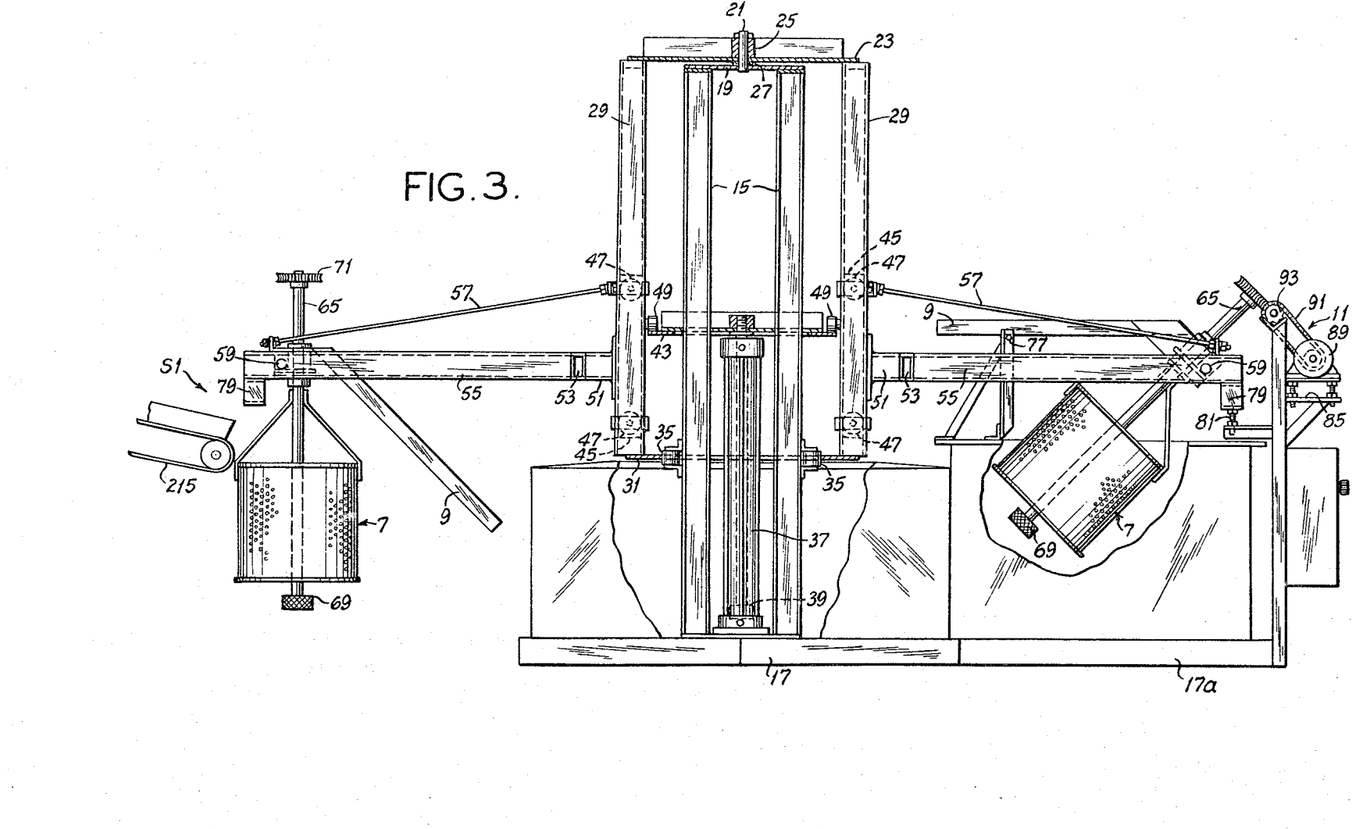
FIG. 3 is a view similar to FIG. 2 showing certain work carriers lowered.

Operation of the above-described work treating apparatus is as follows:

Assuming the apparatus is being used for chrome-plating parts, tank T1 is filled with a chromate solution, tank T2 is filled with cold water for rinsing the parts and tank T3 is filled with hot water as a final rinse. With the barrels 7 in the lowered position as shown in FIG. 3, the barrel 7 at the loading station S1 is loaded with parts to be plated, either manually or by operation of a conveyor 215. Considering the travel of this particular barrel, the barrel is elevated by operation of lift cylinder 37, which elevates plate 43 to raise all the carriages 45, which lifts all the arms 55 and the barrels. When the barrels are lifted, the indexing mechanism shown in FIGS. 11–16 is operated to advance the stated barrel from station S1 to station S2. Lift cylinder 37 then lowers the barrel vertically into tank T1. As the barrel is lowered, rocker arm 9 engages the stop 77 to tilt barrel 7 and shaft 65, thereby engaging the worm gear 71 on shaft 65 with worm 95. Motor 83 drives the shaft 65 to rotate barrel 7 and tumble the parts in the chromate solution. The rotation of the barrel in the solution prevents uneven plating of the parts. By using cylinder 97, the barrel in the chromate tank T1 can be elevated before the barrels at other work stations or set down after the other barrels.

After all of the barrels have been elevated, the conveyor mechanism is again operated to advance the stated barrel from station S2 to station S3 over tank T2. Lift cylinder 37 then lowers the barrel into the cold water rinse tank and the barrel is again tilted and then rotated by operation of the motor 83 at station S3. The barrel is next elevated, advanced and lowered into the hot water rinse in tank T3 at station S4 where it is tilted and rotated. Next, the barrel is elevated and advanced to station S5 and lowered into the drying chamber 105 of the dryer TD. As barrel 7 is lowered into the drying chamber, the rocker arm 9 engages rod 145 to tilt the barrel 7 slightly to its FIG. 7 position to permit complete lowering of the barrel. Then cylinder 135 advances wheel 127 and simultaneously moves rod 145 out of engagement with the arm 9. Wheel 127 is moved to its FIGS. 4 and 6 position in engagement with wheel 69. Motor 123 drives the wheel 127 to turn the friction wheel 69 on shaft 65, thereby rotating the barrel 7 and spinning the parts in the drying chamber. Simultaneously, air is delivered through conduit 107 and across the heating elements at 109 to provide hot air to the drying chamber, thereby facilitating drying of the parts contained in the barrel.

The barrel 7 is subsequently elevated, advanced to work station S6 and lowered to the position shown in FIG. 9. Chute 151 and barrel 7 are then inverted to their FIG. 10 position by operation of cylinder 155 and the plated and dried parts are discharged from barrel 7 and chute 151 onto the conveyor 161. After the parts are removed the chute is lowered to its FIG. 9 position and the barrel is subsequently elevated, advanced to station S1 and lowered while in a vertical position for subsequent reloading with other parts to be plated.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for treating work at a series of work stations along an endless path comprising a conveyor mounted for movement around said endless path, a plurality of work carriers open at the top and supported by said conveyor, means for lifting and vertically lowering said carriers at some of said work stations, means for rotating the carriers at certain of the work stations, and means for tilting the carriers from a vertical position as they are lowered, said means causing engagement of the carriers with the means for rotating the carriers, whereby the carriers are rotated in a tilted position to cause tumbling of the work therein.

2. Apparatus for treating work as set forth in claim 1 wherein the means for tilting the carriers comprises a shaft connected to each carrier, an arm associated with the shaft, a stop at the work stations where the carriers are to be tilted and rotated, the arm of a carrier being lowered at the work station for engaging the stop and tilting the shaft and carrier.

3. Apparatus for treating work as set forth in claim 1 wherein each work carrier comprises a perforated barrel.

4. Apparatus for treating work as set forth in claim 1 wherein the means for rotating the carriers comprises a shaft connected to each carrier, a gear on each shaft, and a drive gear at the work station where the carriers are to be rotated, tilting movement of the carriers causing engagement of said gears.

5. Apparatus for treating work as set forth in claim 1 further including means for holding a carrier elevated at one of the work stations a greater time than the carriers are elevated at other work stations.

6. Apparatus for treating work at a series of work stations along an endless path comprising a conveyor mounted for movement around said endless path, a plurality of work carriers open at the top, an elevator associated with the conveyor and the carriers for vertically lifting and lowering the carriers at the work stations, a rocker arm associated with each carrier, means for engaging the rocker arm to tilt the carriers as they are lowered at one work station, a drive for rotating a tilted carrier at said one work station, a drying chamber at another work station, the chamber being open at the top for receipt of a work carrier, and a drive for rotating a carrier in the drying chamber.

7. Apparatus for treating work as set forth in claim 6 wherein said conveyor holds said carriers at each work station for the same time interval, and means for holding the carriers elevated a longer time at one work station than at other work stations.

8. Apparatus for treating work as set forth in claim 6 wherein one of said work stations constitutes a loading station where work is loaded into the carriers through their open tops.

9. Apparatus for treating work as set forth in claim 6 further comprising means for heating the drying chamber.

10. Apparatus for treating work at a series of work stations along an endless path comprising a conveyor mounted for movement around said endless path, a plurality of work carriers supported by the conveyor, means for vertically lifting and lowering the carriers at work stations, a drying chamber at one of the work stations, an opening in the top of said chamber through which a carrier can be lowered and raised vertically, and means for rotating the carrier in the drying chamber, said means comprising a friction wheel associated with the carrier, a drive wheel movable into engagement with the friction wheel at the beginning of a drying cycle, and two spaced rollers against which the friction wheel is held by the drive wheel.

11. Apparatus for treating work as set forth in claim 10 comprising means for moving the drive wheel away from the rollers to release the friction wheel for elevation of the carrier out of the chamber at the end of a drying cycle.

12. Apparatus for treating work at a series of work stations along an endless path comprising a conveyor mounted for movement around said endless path, a plurality of work carriers supported by the conveyor, means for vertically lifting and lowering the carriers at work stations, a drying chamber at one of the work stations, an opening in the top of said chamber through which a carrier can be lowered and raised vertically, and means for rotating the carrier in the drying chamber, said means comprising a pair of rollers mounted for rotation in a horizontal plane, a drive wheel mounted for rotation in the same horizontal plane, means for moving the drive wheel in said plane toward and away from the rollers, each carrier having a friction wheel at the bottom thereof, means for placing the friction wheel of a carrier between the drive wheel and the rollers in said plane so that the drive wheel can engage and turn the friction wheel to rotate the carrier.

13. Apparatus for treating work as set forth in claim 12 wherein the means for moving the drive wheel comprises a slide on which the wheel is mounted, a guide on which the slide moves, and a cylinder for extending and retracting the slide.

14. Apparatus for treating work as set forth in claim 13 wherein the means for placing the friction wheel of a carrier between the drive wheel and the rollers comprises an arm associated with the carrier for tilting the carrier and its friction wheel from their normally vertical position, and a rod associated with the means for moving the drive wheel, the rod being engageable by the arm when the slide is retracted and the carrier is lowered, the rod releasing the arm as the slide is extended.

15. Apparatus for treating work as set forth in claim 10 further including an unloader for the carriers at the work station following the drying chamber, said unloader comprising a chute mounted at one end for pivotal movement, said carriers being open at the top and lowered onto said chute by the conveyor, and means for elevating the other end of the chute against a carrier for inverting the carrier to discharge work onto the chute.

16. Apparatus for treating work as set forth in claim 15 further comprising means at another work station for tilting a carrier as it is lowered by the conveyor, and means for rotating the tilted carrier to cause tumbling of the work therein.

17. Apparatus for treating work at a series of work stations along an endless path comprising a conveyor mounted for movement around the endless path, a plurality of work carriers open at the top supported by the conveyor, means for vertically lifting the carriers at work stations, the final work station in the series constituting an unloading station, and means for removing treated work from the carriers at the unloading station, said means comprising a chute mounted for pivotal movement at the unloading station, said chute being adapted to receive a carrier as it is lowered at the unloading station, and means for moving the chute about its mounting to invert the carrier and thereby discharge work from the open end of the carrier onto the chute.

18. Apparatus for treating work as set forth in claim 17 wherein the means for moving the chute comprises a cylinder operable to extend and retract a piston rod, said rod having a connection with said chute in spaced relation to its pivotal mounting.

19. Apparatus for treating work as set forth in claim 17 wherein a work station following the unloading station constitutes a loading station, the carriers being in a vertical position when lowered at the loading station.

20. Apparatus for treating work as set forth in claim 19 wherein another work station preceding the unloading station constitutes a drying station, there being a drying chamber at the drying station adapted to receive a carrier for drying work in the carrier.

21. Apparatus for treating work comprising a plurality of work stations along an endless path, a conveyor mounted for movement along said path, at least one work carrier open at the top supported by the conveyor for movement to each of the work stations, means for vertically lifting and lowering the carrier at each work station, a first work station constituting a loading station where work is loaded in the carrier through its open top, a plurality of succeeding stations constituting treating stations, a tank at each of the treating stations, said tanks being open at the top to receive a carrier as it is lowered at the treating stations, means for tilting a carrier as it is lowered into said tanks means for rotating the tilted carrier at each of said tanks, another work station constituting a drying station, a drying chamber at the drying station, said chamber being open at the top for reception of a carrier, the final station constituting an unloading station, and an unloader at the unloading station for removing treated work from a carrier.

22. Apparatus for treating work as set forth in claim 21 including means for maintaining the carrier in an upright vertical position when lowered at the loading station.

23. Apparatus for treating work as set forth in claim 21 further including means for rotating the carrier in said drying chamber.

24. Apparatus for treating work as set forth in claim 21 wherein said unloader comprises means for inverting a carrier to discharge the work through its open top.

25. Apparatus for treating work as set forth in claim 21 having three treating stations along said path between the loading station and the drying station, the tank at the first treating station being adapted to contain a plating solution and the tanks at the other treating stations being adaped to contain rinse solutions.

26. Apparatus for treating work as set forth in claim 25 having a plurality of carriers supported by said conveyor, one carrier being positioned at each work station, and means at one of said stations for holding a carrier elevated at that station for a greater time than the time the carriers are elevated at other work stations.

27. Apparatus for treating work as set forth in claim 21 wherein the means for vertically lifting and lowering the carrier comprises a lift cylinder, a lift plate movable vertically by the cylinder, and means interposed between the lift plate and the carriers for transmitting movement of the lift plate to the carriers.

28. Apparatus for treating work as set forth in claim 21 wherein said conveyor comprises a plate operatively connected to the carriers, a pluraity of spaced stops carried by the plate, means for advancing the plate one step to move a carrier from one work station to the next work station, a holder for engagement with a stop while the carriers are lowered and elevated at their respective work stations, and means for disengaging the holder for advancement of the plate and the carriers.

29. Apparatus for treating work as set forth in claim 28 wherein the means for vertically lifting and lowering the work carriers comprises a lift cylinder, a lift plate movable by the cylinder, carriages vertically movable on the conveyor and operatively connected to the work carriers, said carriages having a sliding connection with said lift plate so that the carriages can be moved vertically by the lift plate for lifting and lowering of the work carriers and advanced with the turret around the lift plate by sliding along the lift plate, thereby moving the work carriers between work stations.

30. Plating apparatus comprising a turret rotatable about a vertical axis, a plurality of elevators carried by the turret spaced at equal intervals around the turret, said elevators being mounted for vertical movement on the turret, a mounting arm structure extending outward from each elevator, a bearing mounted for pivotal movement about a horizontal axis at the outer end of each arm structure with the axis of the bearing at right angles to said horizontal pivot axis, a shaft rotary in each of said bearings, a perforated open-top barrel carried by each shaft coaxially therewith, the weight of each barrel tending to cause it and the respective shaft to hang generally vertically downward, means for raising and lowering the elevators to effect raising and lowering of the barrels, means for indexing the turret when the barrels are raised to effect indexing of the barrels to a series of work stations, a first of said stations constituting a loading station where a barrel, when lowered, hangs generally vertically downward for loading of work to be plated therein through its open top, a number of stations following said loading station constituting treating stations wherein the barrels are lowered into tanks, a station following said treating stations constituting a drying station wherein each successive barrel is lowered into a drying chamber, and a final station constituting an unloading station where work is removed, means for effecting tilting of each barrel as it is lowered at each treating station, and means for rotating each barrel when in tilted position at each treating station.

31. Plating apparatus as set forth in claim 30 wherein the tilting means comprises a rocker arm for each shaft, and a stop at each treating station engageable by the rocker arm for the shaft of the barrel at that station as the barrel is lowered to effect swinging of the rocker arm to tilt the respective shaft and barrel.

32. Plating apparatus as set forth in claim 31 wherein the means for rotating the barrel when in tilted position at each treating station comprises a gear on each shaft and a drive gear at each treating station enmeshed by the gear on the shaft on tilting of the shaft, and means at each treating station for driving the respective drive gear.

33. Plating apparatus as set forth in claim 32 wherein each elevator is adapted for being individually raised and lowered, and means is provided at one of said treating stations for individually raising and lowering the barrel at that station independently of the barrels at the other stations.

34. Plating apparatus as set forth in claim 30 wherein drying chamber is open at the top, and the barrel lowered thereinto hangs downward therein, and wherein means is provided for driving the barrel in the drying chamber while in vertical position therein.

35. Plating apparatus as set forth in claim 30 wherein means is provided at the unloading station for effecting inversion of each barrel as it is lowered at said station to discharge the contents thereof through its open top.

References Cited

UNITED STATES PATENTS

| | | | |
|---|---|---|---|
| 1,492,949 | 5/1924 | Allison | 134—157 X |
| 1,612,585 | 12/1926 | Jackson | 118—52 X |
| 1,656,977 | 1/1928 | Henry | 118—425 |
| 1,779,934 | 10/1930 | Giblin | 118—52 X |
| 2,362,457 | 11/1944 | Anderson | 118—426 X |
| 2,916,131 | 12/1959 | Holden | 118—425 X |

CHARLES A. WILLMUTH, *Primary Examiner.*

J. McINTOSH, *Assistant Examiner.*